US012167196B2

(12) United States Patent
Feng et al.

(10) Patent No.: US 12,167,196 B2
(45) Date of Patent: Dec. 10, 2024

(54) MOBILE TERMINAL HAVING HOUSING AND SPEAKER

(71) Applicant: HUAWEI TECHNOLOGIES CO., LTD., Guangdong (CN)

(72) Inventors: Lu Feng, Shenzhen (CN); Yang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 17/919,712

(22) PCT Filed: Mar. 31, 2021

(86) PCT No.: PCT/CN2021/084536

§ 371 (c)(1),
(2) Date: Oct. 18, 2022

(87) PCT Pub. No.: WO2021/218554

PCT Pub. Date: Nov. 4, 2021

(65) Prior Publication Data

US 2023/0142874 A1 May 11, 2023

(30) Foreign Application Priority Data

Apr. 27, 2020 (CN) ......................... 202010345451.4

(51) Int. Cl.
*H04R 1/28* (2006.01)

(52) U.S. Cl.
CPC ........ *H04R 1/2807* (2013.01); *H04R 2499/11* (2013.01)

(58) Field of Classification Search
CPC .......... H04R 1/02; H04R 1/025; H04R 1/028; H04R 1/026; H04R 1/2826; H04R 1/44;
(Continued)

(56) References Cited

U.S. PATENT DOCUMENTS 10,225,645 B1 * 3/2019 Lv .......................... H04R 1/021
2018/0035198 A1 * 2/2018 Zhong .................... H04R 9/025
(Continued)

FOREIGN PATENT DOCUMENTS

CN 108924710 A 11/2018
CN 208638636 U 3/2019
(Continued)

*Primary Examiner* — Antim G Shah
*Assistant Examiner* — Sabrina Diaz
(74) *Attorney, Agent, or Firm* — HUAWEI TECHNOLOGIES CO., LTD.

(57) ABSTRACT

A mobile terminal is provided, including a housing (21) and a speaker (10). The speaker (10) includes a box (11) and a sound generation unit (12). The box (11) includes a first cover body (117), a second cover body (118), and a cover plate (13). A first chamber is formed between the sounding unit (12) and the inner bottom wall of the first cover body, and a sound hole (113) is disposed in the first cavity (111). A second cavity (112) is formed between the sound generation unit (12) and the second cover body (118). The sound generation unit (12) includes a diaphragm (123). A resonant cavity (114) with a through hole (116) on one side is formed in the first cover body (117), the cover plate (13) covers the through hole (116), and a microhole (115) is disposed. Airflow enters the second cavity (112) through the microhole (115).

13 Claims, 8 Drawing Sheets

(58) Field of Classification Search
CPC .... H04R 1/28; H04R 1/2807; H04R 2499/11; H04R 2499/15
USPC ....... 381/353, 332, 333, 334, 335, 337, 345, 381/351
See application file for complete search history.

(56) References Cited

U.S. PATENT DOCUMENTS

| | | | | |
|---|---|---|---|---|
| 2018/0213319 | A1 | 7/2018 | Qin | |
| 2020/0045398 | A1* | 2/2020 | Wu | H04R 1/025 |
| 2020/0045408 | A1* | 2/2020 | Wu | H04R 1/288 |

FOREIGN PATENT DOCUMENTS

| | | | | | |
|---|---|---|---|---|---|
| CN | 109874067 | A | | 6/2019 | |
| CN | 110248275 | A | * | 9/2019 | H04R 1/28 |
| CN | 209390294 | U | | 9/2019 | |
| CN | 110381399 | A | | 10/2019 | |
| CN | 209659597 | U | | 11/2019 | |
| CN | 210093483 | U | | 2/2020 | |
| CN | 210202000 | U | | 3/2020 | |
| CN | 110958509 | A | | 4/2020 | |
| CN | 210641068 | U | * | 5/2020 | H04R 9/06 |

* cited by examiner

MOBILE TERMINAL HAVING HOUSING AND SPEAKER

CROSS-REFERENCE TO RELATED APPLICATIONS

This application is a National Stage of International Application No. PCT/CN2021/084536, filed on Mar. 31, 2021, which claims priority to Chinese Patent Application No. 202010345451.4, filed on Apr. 27, 2020. Both of the aforementioned applications are hereby incorporated by reference in their entireties.

TECHNICAL FIELD

This application pertains to the field of audio device technologies, and in particular, to a mobile terminal.

BACKGROUND

A terminal device such as a mobile phone, a tablet computer, or a notebook computer is equipped with a speaker. The speaker includes a box and a sound generation unit disposed in the box. When the speaker is applied to the terminal device, the box of the speaker communicates with an external environment through a sound hole.

In the conventional technology, the speaker communicates with internal space of the terminal device. Therefore, when a housing of the terminal device is pressed and a size of the internal space of the terminal device changes, atmospheric pressure in front space and rear space of a diaphragm in the box of the speaker changes correspondingly. In this case, vibration frequency of air in the sound generation unit is disturbed. Consequently, the diaphragm moves up and down to generate noise, and may touch a magnetic part in the sound generation unit and be damaged. In addition, there is relatively significant sibilance and a relatively significant metal sound when the speaker generates a sound.

SUMMARY

Embodiments of this application are intended to provide a mobile terminal, to resolve a technical problem, in the conventional technology, that when a housing of the mobile terminal is pressed and a size of internal space changes, there is relatively significant sibilance and a relatively significant metal sound when a speaker in the mobile terminal generates a sound.

To achieve the foregoing objective, technical solutions used in this application are as follows: A mobile terminal is provided. The mobile terminal includes a housing and a speaker disposed in the housing. The speaker includes a box and a sound generation unit configured to generate a sound. The box includes a first cover body and a second cover body and a cover plate that are located on the first cover body. The sound generation unit is disposed in the first cover body, and a first cavity is formed between the sound generation unit and an inner bottom wall of the first cover body. A sound hole that communicates with an external environment of the housing is disposed in the first cavity. A second cavity is formed between the sound generation unit and an inner top wall of the second cover body. The sound generation unit includes a diaphragm configured to generate a sound through vibration, and two opposite surfaces of the diaphragm respectively correspond to the first cavity and the second cavity. A resonant cavity is formed in the first cover body, the resonant cavity communicates with the first cavity, and a through hole is disposed on a side that is of the resonant cavity and that faces the second cavity. The cover plate covers the through hole, and a microhole that communicates with the second cavity is disposed on the cover plate.

In the mobile terminal provided in this embodiment of this application, the speaker is disposed in the housing of the mobile terminal, the first cavity is formed between the sound generation unit in the speaker and the first cover body of the box, the second cavity is formed between the sound generation unit and the second cover body of the box, the sound generated by the sound generation unit is output to the external environment through the sound hole, the first cavity communicates with the second cavity through the resonant cavity, the cover plate on which the microhole is disposed is disposed at the through hole of the resonant cavity, and the resonant cavity communicates with the second cavity through the microhole. In this way, balance of atmospheric pressure can be maintained for the first cavity and the second cavity of the box through the resonant cavity, so that the diaphragm in the sound generation unit vibrates normally. The second cavity communicates with the resonant cavity through the microhole, and a relatively small volume of airflow can pass through the microhole. Therefore, circulation of airflow in the second cavity is reduced. In this way, when the box is pressed or returns to a normal state from a pressed state, the airflow enters and exits the second cavity through the microhole, and therefore atmospheric pressure in the second cavity does not change significantly. The first cavity communicates with the external environment through the sound hole, and therefore atmospheric pressure in the first cavity also does not change significantly. Therefore, when the diaphragm in the sound generation unit vibrates, an amplitude of the diaphragm can be kept within a proper range. In this way, the diaphragm does not collide with a magnetic part in the sound generation unit during vibration, and therefore sibilance and a metal sound that exist when the speaker generates a sound, especially when a high-frequency sound is generated, are effectively suppressed, thereby improving quality of the high-frequency sound generated by the speaker.

Optionally, an enclosure frame is disposed in the first cover body, the sound generation unit is mounted to the enclosure frame, a first region is formed at intervals between an inner sidewall of the first cover body and an outer sidewall of the enclosure frame, a block object is disposed in the first region, and the resonant cavity is disposed in the block object. The first region is formed at intervals between an inner wall of the first cover body and an outer wall of the enclosure frame, and the resonant cavity is disposed in the block object in the first region, so that assembly space in the box is fully used, and the resonant cavity is independently disposed with respect to the first cavity and the second cavity.

Optionally, the box further includes a multihole object, and the multihole object is disposed on the cover plate and covers the microhole. The multihole object is disposed on the cover plate, and the multihole object covers the microhole, so that a combination of the multihole object and the microhole is used to further limit a volume of airflow that enters and exits the second cavity, so as to further stabilize the atmospheric pressure in the second cavity.

Optionally, the multihole object is attached to a side that is of the cover plate and that faces or faces away from the resonant cavity.

Optionally, a concave cavity is disposed on a side that is of the cover plate and that faces or faces away from the resonant cavity, the multihole object is mounted in the concave cavity, and the microhole is disposed at a bottom of the concave cavity. The concave cavity is disposed on the cover plate, and the multihole object is mounted in the concave cavity, to improve connection stability between the multihole object and the cover plate, and to facilitate fast removal and replacement of the multihole object with respect to the cover plate.

Optionally, a gap is formed between an outer edge of the multihole object and a cavity wall of the concave cavity.

Optionally, the multihole object is a mesh, and the mesh is made of a nonwoven fabric; or the mesh is formed by stacking a nonwoven fabric and degreased gauze. The multihole object is specifically set as a mesh. In this way, because of relatively good permeability of the mesh and the fact that holes on the mesh are relatively evenly and finely distributed, the mesh cooperates with the microhole, to precisely adjust the volume of airflow that enters and exits the second cavity.

Optionally, the box further includes a polyethylene-terephthalate (PET) film, the PET film covers a side that is of the cover plate and that faces the resonant cavity, and a first breather region that communicates with the resonant cavity is formed between the PET film and the cover plate.

Optionally, the box further includes a PET film, the PET film covers a side that is of the cover plate and that faces away from the resonant cavity, and a second breather region that communicates with the second cavity is formed between the PET film and the cover plate.

Optionally, the box further includes a PET film, the PET film covers a side that is of the cover plate and that faces or faces away from the resonant cavity, and several breather holes are disposed on the PET film.

Optionally, a connection channel is disposed on a cavity wall of the first cavity, the connection channel penetrates through the enclosure frame and the block object, and communicates with the resonant cavity, and a cross-sectional area of the connection channel is greater than an opening area of the microhole. It is set that the cross-sectional area of the connection channel is greater than the opening area of the microhole, so that a speed at which the airflow enters the resonant cavity from the first cavity is greater than a speed at which the airflow enters the second cavity from the resonant cavity, to reduce a speed at which the airflow is exchanged between the first cavity and the second cavity.

Optionally, the cross-sectional area of the connection channel is 2 to 15 times the opening area of the microhole. In this way, the speed at which the airflow is exchanged between the first cavity and the second cavity is precisely controlled.

Optionally, an aperture of the microhole ranges from 0.5 mm to 2 mm. In this way, the volume of airflow that enters and exits the second cavity is effectively controlled.

BRIEF DESCRIPTION OF DRAWINGS

To describe technical solutions in embodiments of this application or the conventional technology more clearly, the following briefly introduces the accompanying drawings required for describing embodiments or the conventional technology. It is clear that the accompanying drawings in the following descriptions show some embodiments of this application, and a person of ordinary skill in the art may still derive other drawings from these accompanying drawings without creative efforts.

REFERENCE NUMERALS IN THE DRAWINGS

Figure 1:
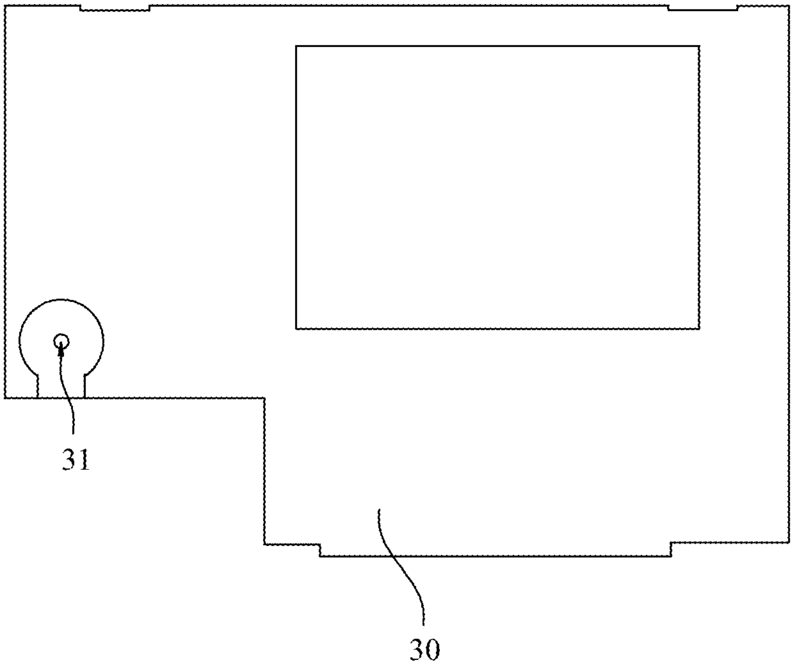
FIG. 1 (Prior Art)
FIG. 1 is an accompanying drawing in the conventional technology.

10: Speaker; 11: Box; 12: Sound generation unit;
13: Cover plate; 14: Multihole object; 15: PET film;
16: First region; 17: Block object; 18: Connection channel;
20: Mobile terminal; 21: Housing; 23: Notch;
30: Sound generation apparatus; 31: Air discharge hole; 111: First cavity;
112: Second cavity; 113: Sound hole; 114: Resonant cavity;
115: Microhole; 116: Through hole; 117: First cover body;
118: Second cover body; 119: Enclosure frame; 121: Frame;
122: Voice coil; 123: Diaphragm; 124: Washer;
125: Magnetic part; 126: Iron core; 127: Flexible circuit board;
131: Concave cavity; 141: Mesh; 142: Nonwoven fabric;
143: Degreased gauze layer; 151: First breather region; 152: Second breather region; and
153: Breather hole.

DESCRIPTION OF EMBODIMENTS

The embodiments of this application are described below in detail. Examples of the embodiments are shown in the accompanying drawings, and same or similar reference numerals represent same or similar elements or elements with same or similar functions. The embodiments described below with reference to FIG. 1 to FIG. 11 are examples, are intended to explain this application, and should not be understood as a limitation on this application.

In the descriptions of this application, it should be understood that directions or positional relationships indicated by terms such as “length”, “width”, “up”, “down”, “front”, “back”, “left”, “right”, “vertical”, “horizontal”, “top”, “bottom”, “inside”, and “outside” are directions or positional relationships shown based on the accompanying drawings, are merely used for facilitating description of this application and for description simplicity, and do not indicate or imply that an indicated apparatus or element needs to have a specific direction or needs to be constructed and operated in a specific direction. Therefore, this should not be understood as a limitation on this application.

In addition, the terms "first" and "second" are merely intended for a purpose of description, and shall not be understood as an indication or implication of relative importance or implicit indication of the number of indicated technical features. Therefore, a feature limited by "first" or "second" may explicitly indicate or implicitly include one or more such features. In the descriptions of this application, unless otherwise expressly and specifically limited, "a plurality of" means two or more.

In this application, unless otherwise expressly specified and limited, terms such as "mounting", "connected", "connection", and "fastening" should be understood in a broad sense. For example, there may be a fixed connection, a detachable connection, or an integrated connection; there may be a mechanical connection or an electrical connection; or there may be a direct connection, an indirect connection established by using an intermediate medium, or a connection inside two elements or an interaction relationship between two elements. A person of ordinary skill in the art may understand specific meanings of the foregoing terms in this application based on a specific situation.

For ease of understanding, technical terms in this application are first explained and described below.

A speaker is an energy conversion device that converts an electrical signal into a sound signal. The speaker electrically drives a voice coil in the speaker to vibrate, and drives a diaphragm to vibrate, so that air around the speaker resonates and generates a sound.

PET (Polyethylene-terephthalate) is a thermoplastic polyester including polyethylene terephthalate. PET is a polycondensate of terephthalic acid and ethylene glycol, and is commonly known as polyester resin in the industry.

A nonwoven fabric is made of an orientated or random fiber, and has advantages such as moisture-proof, breathable, flexible, lightweight, non-combustible, and easy to decompose.

Degreased gauze refers to pure cotton gauze obtained after degreasing treatment.

FIG. 1 is a schematic diagram of a structure of a sound generation apparatus 30 in the conventional technology. It is shown in FIG. 1 that an air discharge hole 31 is disposed on a housing of the sound generation apparatus 30. When the sound generation apparatus 30 is assembled into an external terminal device, the air discharge hole 31 of the sound generation apparatus communicates with internal space of the terminal device.

Figure 2:
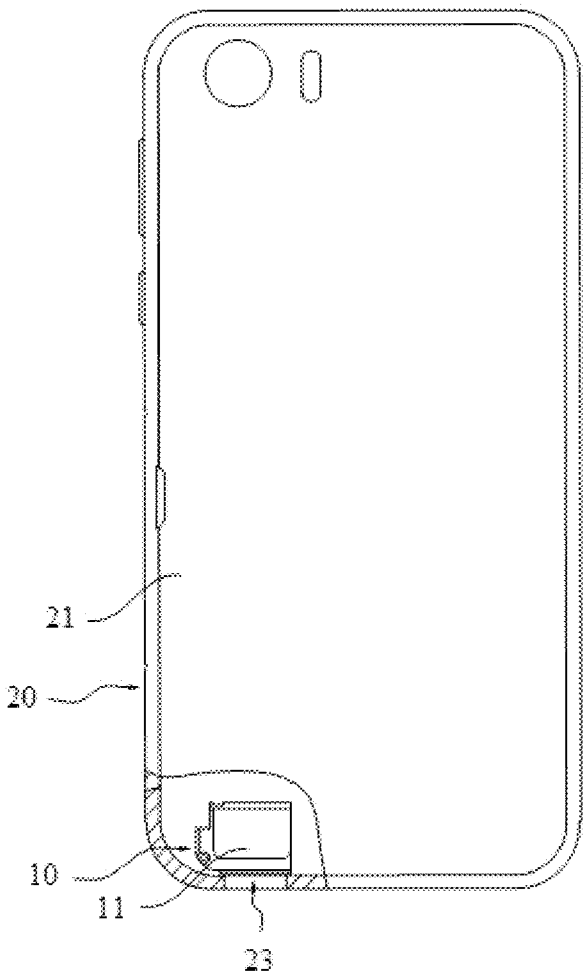
FIG. 2 is a schematic diagram of structures of a mobile terminal and a speaker according to an embodiment of this application.

As shown in FIG. 2, an embodiment of this application provides a mobile terminal 20. The mobile terminal 20 includes a housing 21 and a speaker 10 disposed in the housing 21. The mobile terminal 20 includes but is not limited to a mobile phone, a tablet computer, a notebook computer, an ultra-mobile personal computer (ultra-mobile personal computer, UMPC), a netbook, a personal digital assistant (personal digital assistant, PDA), or the like. In particular, the mobile terminal 20 has a relatively high waterproof sealing property. A specific type of the mobile terminal 20 is not limited in this embodiment of this application.

Figure 3:
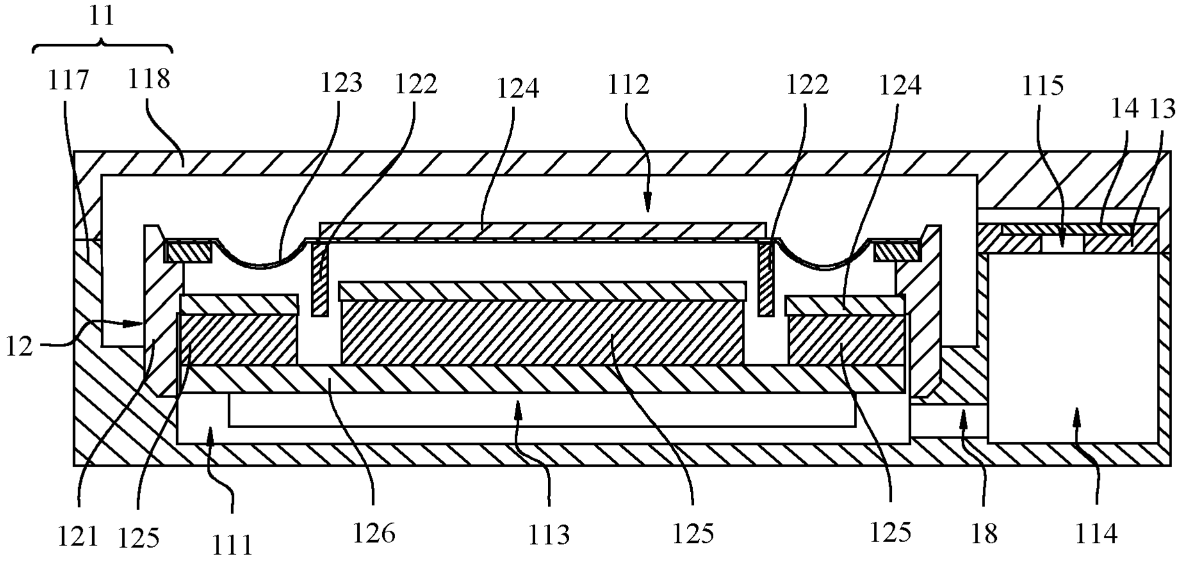
FIG. 3 is a schematic diagram 1 of a cutaway structure of a speaker according to an embodiment of this application.

Referring to FIG. 2 and FIG. 3, the speaker 10 includes a box 11 and a sound generation unit 12 configured to generate a sound. The box 11 includes a first cover body 117 and a second cover body 118 and a cover plate 13 that are located on the first cover body 117. The sound generation unit 12 is disposed in the first cover body 117, and a first cavity 111 is formed between the sound generation unit 12 and an inner bottom wall of the first cover body 117. A sound hole 113 that communicates with an external environment of the housing 21 is disposed in the first cavity 111. A notch 23 is disposed at a position that is of the housing 21 of the mobile terminal 20 and that corresponds to the sound hole 113 of the speaker 10, so that a sound generated by the speaker 10 is conducted to the external environment. A second cavity 112 is formed between the sound generation unit 12 and an inner top wall of the second cover body 118.

Figure 4:
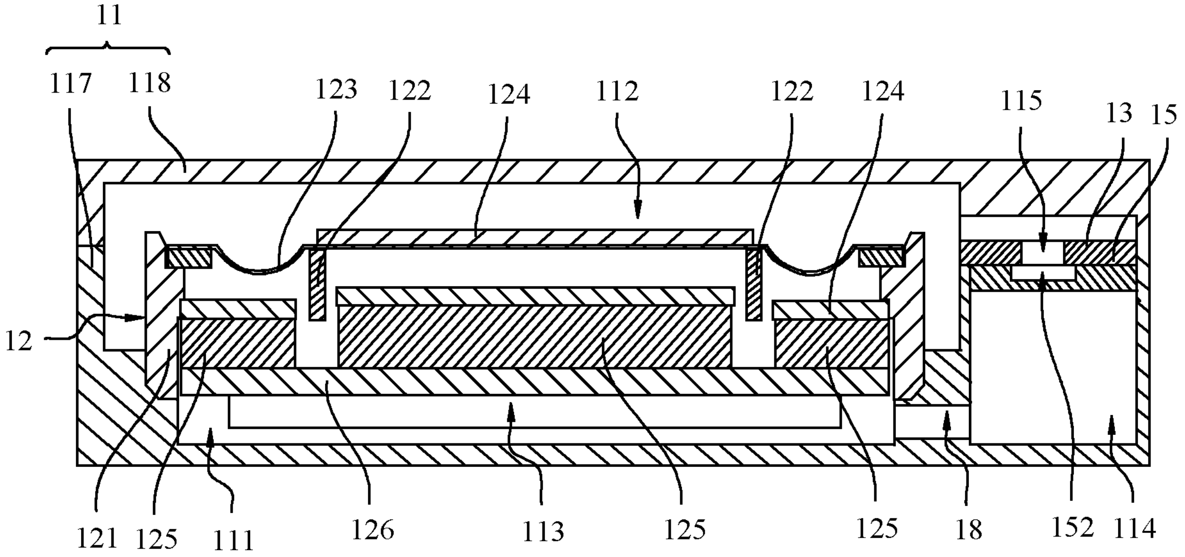
FIG. 4 is a schematic diagram 2 of a cutaway structure of a speaker according to an embodiment of this application.
Figure 5:
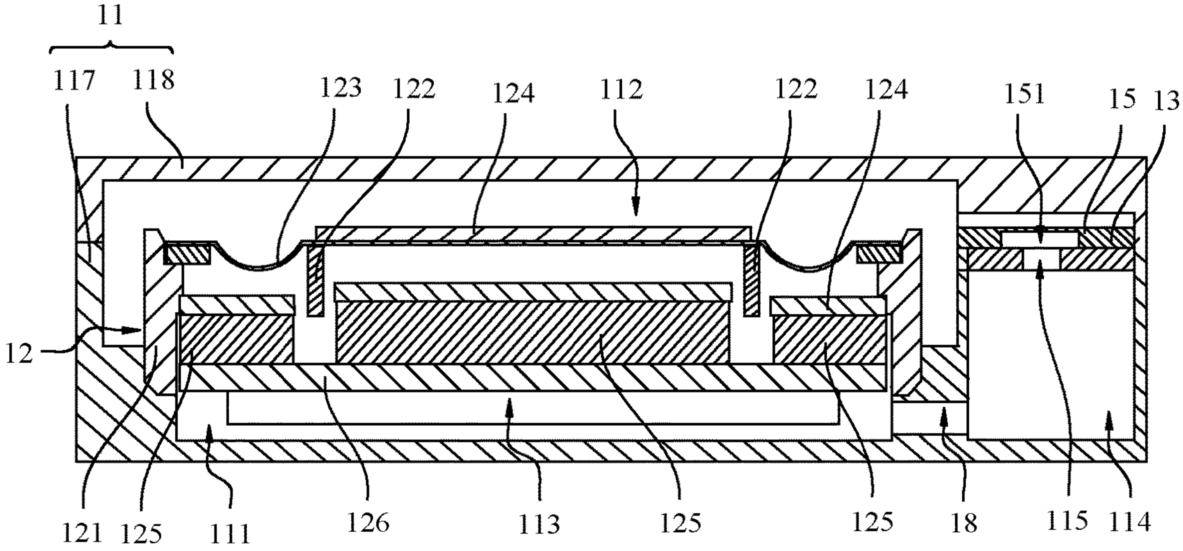
FIG. 5 is a schematic diagram 3 of a cutaway structure of a speaker according to an embodiment of this application.
Figure 7:
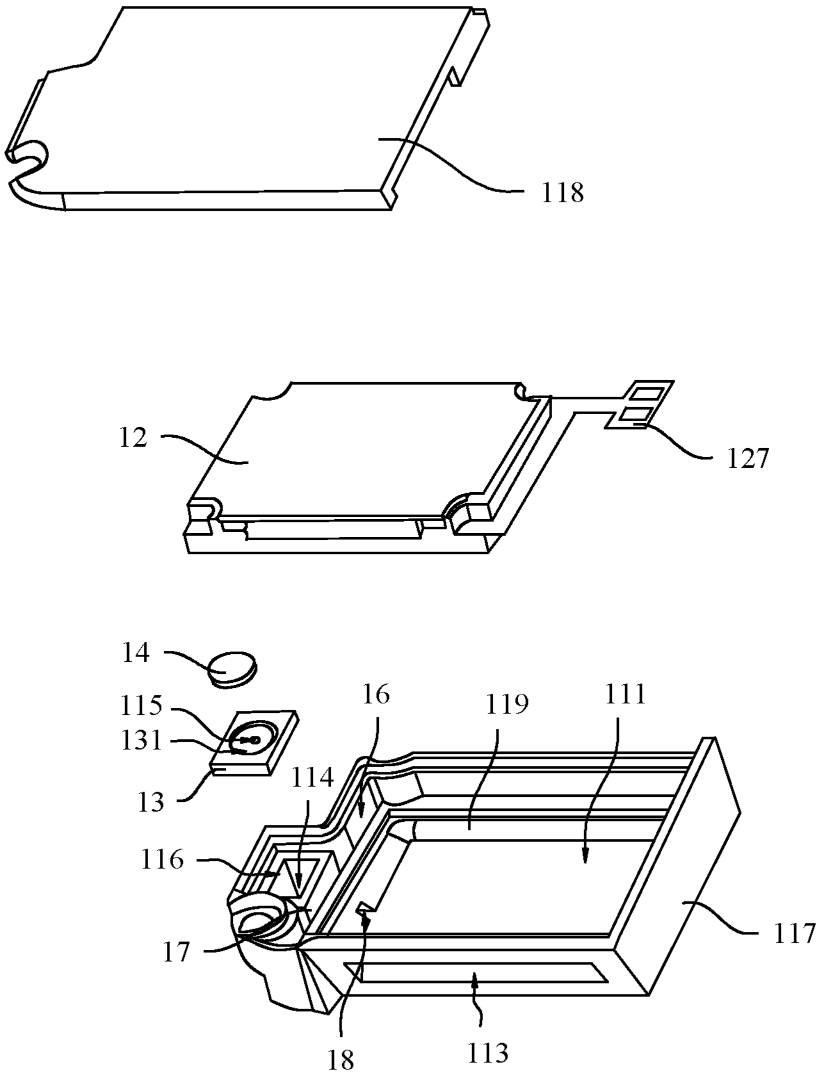
FIG. 7 is a schematic diagram of an exploded structure of a speaker according to an embodiment of this application.

In this embodiment of this application, the sound generation unit 12 may be a dome sound generation unit, a reed sound generation unit, a cone sound generation unit, or the like. Referring to FIG. 3 to FIG. 5, basic components of the sound generation unit 12 may include a frame 121, a voice coil 122 disposed in the frame 121, and a diaphragm 123 that surrounds a periphery of the voice coil 122 and that is exposed to the frame 121. A washer 124 and a magnetic part 125 are sequentially disposed below the diaphragm 123, and an iron core 126 is disposed below the magnetic part 125. Referring to FIG. 7, a flexible circuit board 127 configured to be electrically connected to a related electronic device in the mobile terminal 20 is further led out from the speaker 10.

Referring to FIG. 2 to FIG. 4, two opposite surfaces of the diaphragm 123 in the sound generation unit 12 respectively correspond to the first cavity 111 and the second cavity 112. A resonant cavity 114 is formed in the first cover body 117, the resonant cavity 114 communicates with the first cavity 111, and a through hole 116 is disposed on a side that is of the resonant cavity 114 and that faces the second cavity 112. The cover plate 13 covers the through hole 116, and a microhole 115 that communicates with the second cavity 112 is disposed on the cover plate 13. In this embodiment, a surface that is of the diaphragm 123 and that faces away from the magnetic part 125 is disposed to correspond to the first cavity 111, and a surface that is of the diaphragm 123 and that faces the magnetic part 125 is disposed to correspond to the second cavity 112.

More specifically, in this embodiment of this application, the second cavity 112 of the speaker 10 does not communicate with internal space of the housing 21 of the mobile terminal 20, which is different from the design, in the conventional technology, in which the air discharge hole 31 that communicates with an inside of the terminal device is disposed on the housing of the sound generation apparatus 30 (as shown in FIG. 1). As shown in FIG. 2 to FIG. 4, the resonant cavity 114 communicates with the second cavity 112 through the microhole 115.

As shown in FIG. 3, the speaker 10 provided in this embodiment of this application is further described below. In the speaker 10 provided in this embodiment of this application, the sound generation unit 12 of the speaker 10 is disposed in the box 11, the first cavity 111 is formed between the sound generation unit 12 and the first cover body 117 of the box 11, the second cavity 112 is formed between the sound generation unit 12 and the second cover body 118 of the box 11, the sound generated by the sound generation unit 12 is output to the external environment through the sound hole 113, the first cavity 111 communicates with the second cavity 112 through the resonant cavity 114, the cover plate 13 on which the microhole 115 is disposed is disposed at the through hole 116 of the resonant cavity 114, and the resonant cavity 114 communicates with the second cavity 112 through the microhole 115. In this way, balance of atmospheric pressure can be maintained for the first cavity 111 and the second cavity 112 of the speaker 10 through the resonant cavity 114, so that the diaphragm 123 in the sound generation unit 10 vibrates normally. The second cavity 112 communicates with the resonant cavity 114 through the microhole 115, and a relatively small volume of airflow can pass through the microhole 115. Therefore, circulation of airflow in the second cavity 112 is reduced. In this way, when the box 11 is pressed or returns to a normal state from a pressed state, the airflow enters and exits the second cavity 112 through the microhole 115, and therefore atmospheric pressure in the second cavity 112 does not change significantly. The first cavity 111 communicates with the external environment through the sound hole 113, and therefore atmospheric pressure in the first cavity 111 also does not change significantly. Therefore, when the diaphragm 123 in the sound generation unit 12 vibrates, an amplitude of the diaphragm 123 can be kept within a proper range. In this way, the diaphragm 123 does not collide with the magnetic part 125 in the sound generation unit 12 during vibration, and therefore sibilance and a metal sound that exist when the speaker 10 generates a sound, especially when a high-frequency sound is generated, are effectively suppressed, thereby improving quality of the high-frequency sound generated by the speaker 10.

The through hole 116 is disposed on one side of the resonant cavity 114, and the microhole 115 is formed on the cover plate 13 that covers the through hole 116. In this way, when an aperture size of the microhole 115 needs to be adjusted, the cover plate 13 may be removed and replaced with a cover plate 13 that includes a microhole 115 with a corresponding aperture, to flexibly adjust an aperture of the microhole 115.

Optionally, the cover plate 13 may be mounted to the through hole 116, to improve convenience of removing and replacing the cover plate 13 with respect to the second cavity 112, or may be bonded to an outer edge of the through hole 116 in a manner such as gluing or hot-melt bonding, to improve assembly stability of the cover plate 13 with respect to the second cavity 112.

Optionally, the microhole 115 may be an irregularly shaped hole such as a round hole, an elliptical hole, or a rectangular hole. A specific hole type of the microhole 115 may be determined based on a volume of to-be-exchanged airflow designed for the second cavity 112.

Figure 6:
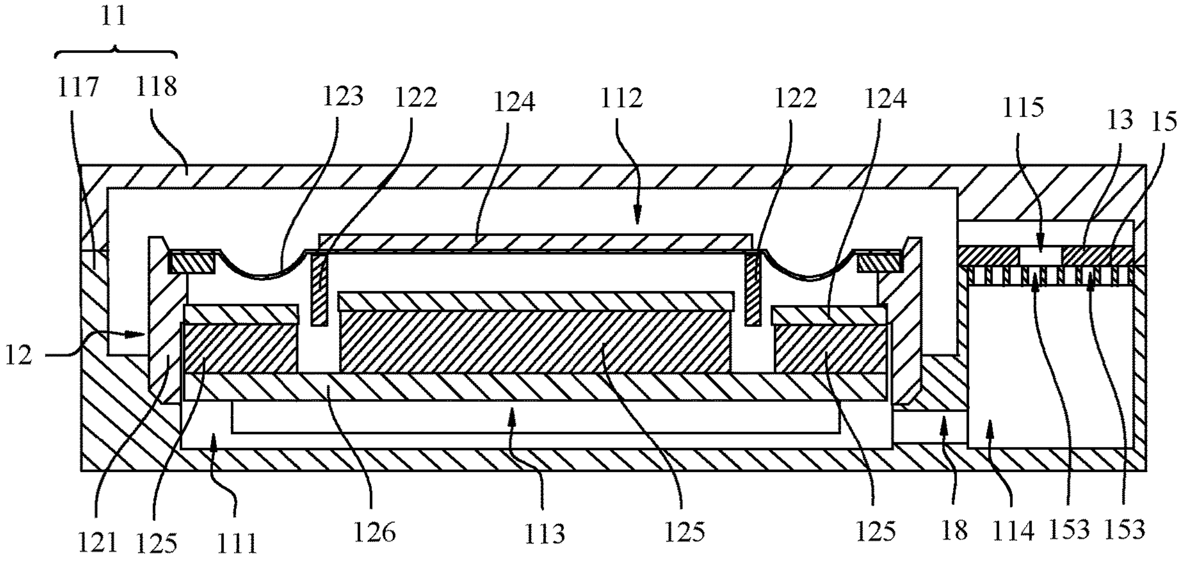
FIG. 6 is a schematic diagram 4 of a cutaway structure of a speaker according to an embodiment of this application.

In some other embodiments of this application, as shown in FIG. 5 to FIG. 7, an enclosure frame 119 is disposed in the first cover body 117, the sound generation unit 12 is mounted to the enclosure frame 119, a first region 16 is formed at an interval between an inner wall of the first cover body 117 and an outer wall of the enclosure frame 119, a block object 17 is disposed in the first region 16, the resonant cavity 114 is disposed in the block object 17, and a connection channel 18 penetrates through the enclosure frame 119 and the block object 17, and communicates with the resonant cavity 114.

Specifically, space between the sound generation unit 12 and the enclosure frame 119 may be sealed through gluing. In this way, the first cavity 111 and the second cavity 112 are isolated and sealed, and glue is used as a buffer between the sound generation unit 12 and the enclosure frame 119, to eliminate excessive vibration caused due to mutual collision between the sound generation unit 12 and the enclosure frame 119, so as to improve a sound generation effect of the sound generation unit 12.

The first region 16 is formed at intervals between the inner wall of the first cover body 117 and the outer wall of the enclosure frame 119, and the resonant cavity 114 is disposed in the block object 17 in the first region 16, so that assembly space in the box 11 is fully used, and the resonant cavity 114 is independently disposed with respect to the first cavity 111 and the second cavity 112.

Optionally, the block object 17 may be integrally formed with the first cover body 117, to reduce manufacturing costs of the box 11. Alternatively, the block object 17 may be independently manufactured and formed, and then mounted to or bonded to the first region 16. In this way, the block object 17 and the first cover body 117 may not need to be made of a same material. For example, the first cover body 17 may be made of a plastic part, and the block object 17 may be made of a metal part. In addition, the block object may be in a square shape or an irregular shape. A shape of the block object may be determined based on a size and a shape of assembly space available in the first region 16.

Figure 8:
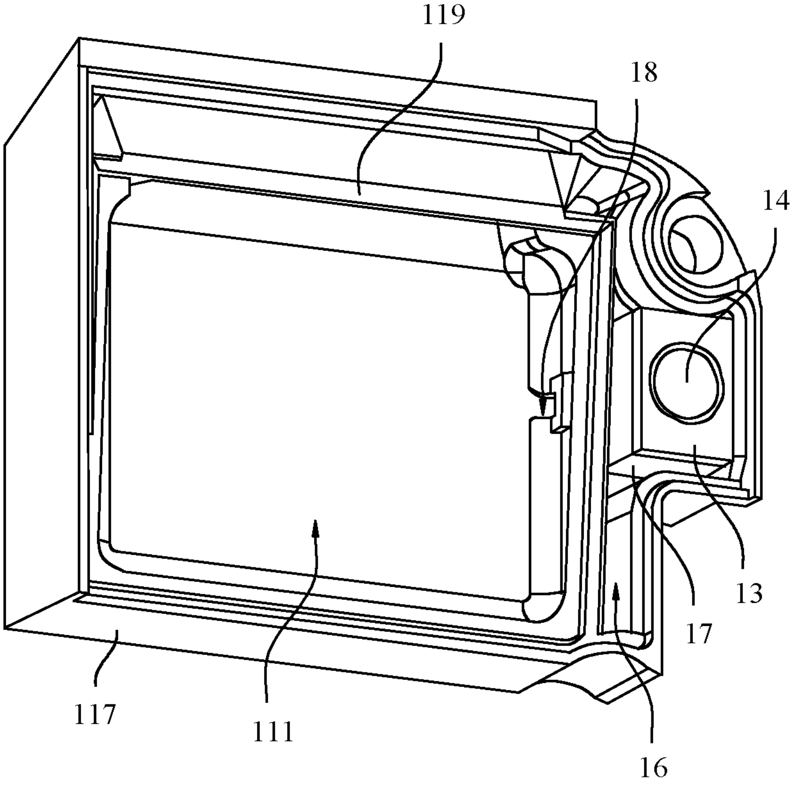
FIG. 8 is a schematic diagram 1 of a partial structure of a speaker according to an embodiment of this application.

In some other embodiments of this application, as shown in FIG. 3, FIG. 7, and FIG. 8, the box 11 further includes a multihole object 14, and the multihole object 14 is disposed on the cover plate 13 and covers the microhole 115.

Specifically, the multihole object 14 is disposed on the cover plate 13, and the multihole object 14 covers the microhole 115, so that a combination of the multihole object 14 and the microhole 115 is used to further limit a volume of airflow that enters and exits the second cavity 112, so as to further stabilize the atmospheric pressure in the second cavity 112.

Optionally, the multihole object 14 may be removably disposed on the cover plate 13 by using double-sided adhesive or the like. In this way, multihole objects 14 with different thicknesses may be used through replacement, to further precisely adjust the volume of airflow that enters and exits the second cavity 112, so as to precisely adjust and control the atmospheric pressure in the second cavity 112.

In some other embodiments of this application, the multihole object 14 is attached to a side that is of the cover plate 13 and that faces or faces away from the resonant cavity 114.

Specifically, the multihole object 14 may be mounted on the side that is of the cover plate 13 and that faces or faces away from the resonant cavity 114 based on a size of assembly space on the side that is of the cover plate 13 and that faces or faces away from the resonant cavity 114.

Figure 9:
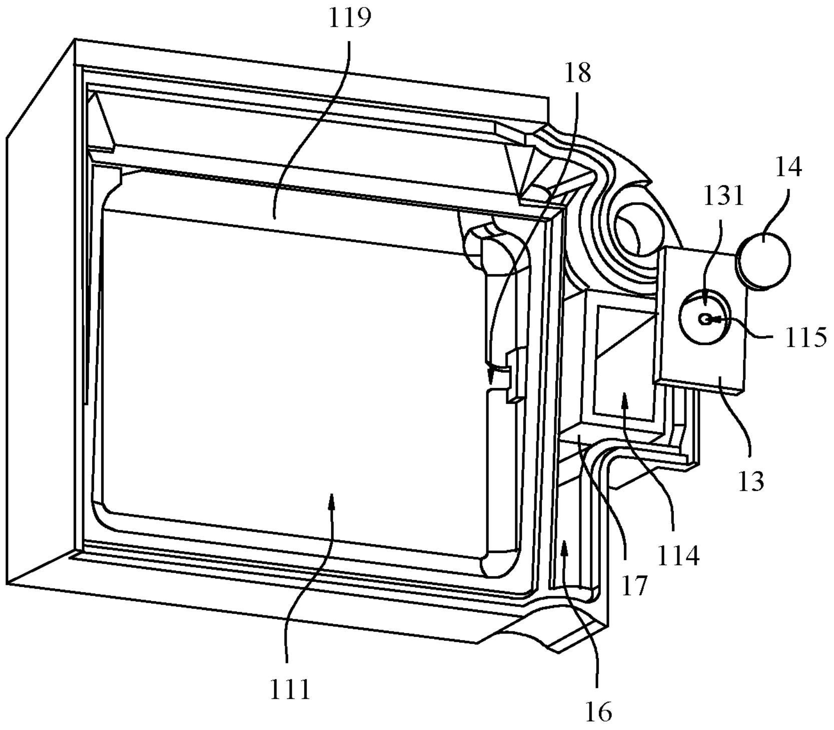
FIG. 9 is a schematic diagram 2 of a partial structure of a speaker according to an embodiment of this application.

In some other embodiments of this application, as shown in FIG. 7 to FIG. 9, a concave cavity 131 is disposed on a side that is of the cover plate 13 and that faces or faces away from the resonant cavity 114, the multihole object 14 is mounted in the concave cavity 131, and the microhole 115 is disposed at a bottom of the concave cavity 131.

Specifically, the concave cavity 131 is disposed on the cover plate 13, and the multihole object 14 is mounted in the concave cavity 131, to improve connection stability between the multihole object 14 and the cover plate 13, and to facilitate fast removal and replacement of the multihole object 14 with respect to the cover plate 13.

Optionally, the multihole object 14 is bonded to the concave cavity 131, to improve assembly stability of the multihole object 14 in the concave cavity 131. In addition, an outer edge of the multihole object 14 may be connected to a cavity wall of the concave cavity 131 or an edge at the bottom of the concave cavity 131 through gluing or by attaching double-sided adhesive, so that when the airflow flows into the multihole object 14 through the microhole 115, the airflow does not flow out from a gap between the multihole object 14 and the cavity wall of the concave cavity 131, and most of the airflow flows into the second cavity 112 or the resonant cavity 114 through the multihole object 14. In this way, utilization of the multihole object 14 is improved, and a function of blocking the airflow by the multihole object 14 is fully used.

In some other embodiments of this application, a gap is formed between the outer edge of the multihole object 14 and the cavity wall of the concave cavity 131.

Specifically, a gap is formed between the outer edge of the multihole object 14 and the cavity wall of the concave cavity 131. In this way, it may be convenient to pull the multihole object 14 out of the concave cavity 131, so that the multihole object 14 can be quickly removed from the concave cavity 131, and assembly convenience of the multihole object 14 with respect to the concave cavity 131 is improved.

In some other embodiments of this application, the multihole object 14 is a mesh 141, and the mesh 141 may be made of a nonwoven fabric 142.

Specifically, the multihole object 14 is specifically set as the mesh 141. In this way, because of relatively good permeability of the mesh 141 and the fact that holes on the mesh 141 are relatively evenly and finely distributed, the mesh 141 cooperates with the microhole 115, to precisely adjust the volume of airflow that enters and exits the second cavity 112 and to improve smoothness and evenness of the airflow that enters and exits the second cavity 112. In addition, the mesh 141 is easy to obtain and is manufactured at low costs. Therefore, overall manufacturing costs of the speaker 10 are reduced.

The nonwoven fabric 142 has advantages of breathable, flexible, lightweight, and non-toxic. Therefore, the nonwoven fabric 142 can effectively control the volume of airflow that enters and exits the second cavity 112, and improve environmental friendliness of the speaker 10 in terms of material selection.

Figure 10:
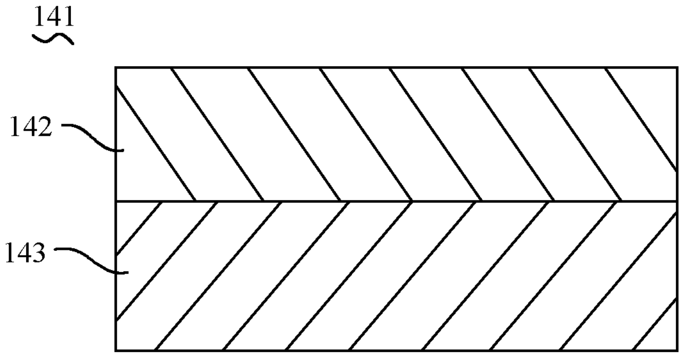
FIG. 10 is a cutaway drawing of a cross section of a mesh of a speaker according to an embodiment of this application.

In some other embodiments of this application, as shown in FIG. 10, the mesh 141 may be formed by stacking a nonwoven fabric 142 and a degreased gauze layer 143. In this way, in addition to the foregoing advantages, the mesh 141 can further effectively prevent a fine impurity in the air from entering and exiting the second cavity 112, to prevent the fine impurity from flowing freely between the first cavity 111 and the second cavity 112, so as to prevent the fine impurity from affecting vibration of the diaphragm 123. Therefore, quality of a sound generated by the speaker 10 is improved.

Optionally, the multihole object 14 may alternatively be made of a material such as a sponge in consideration of costs and the like.

Figure 11:
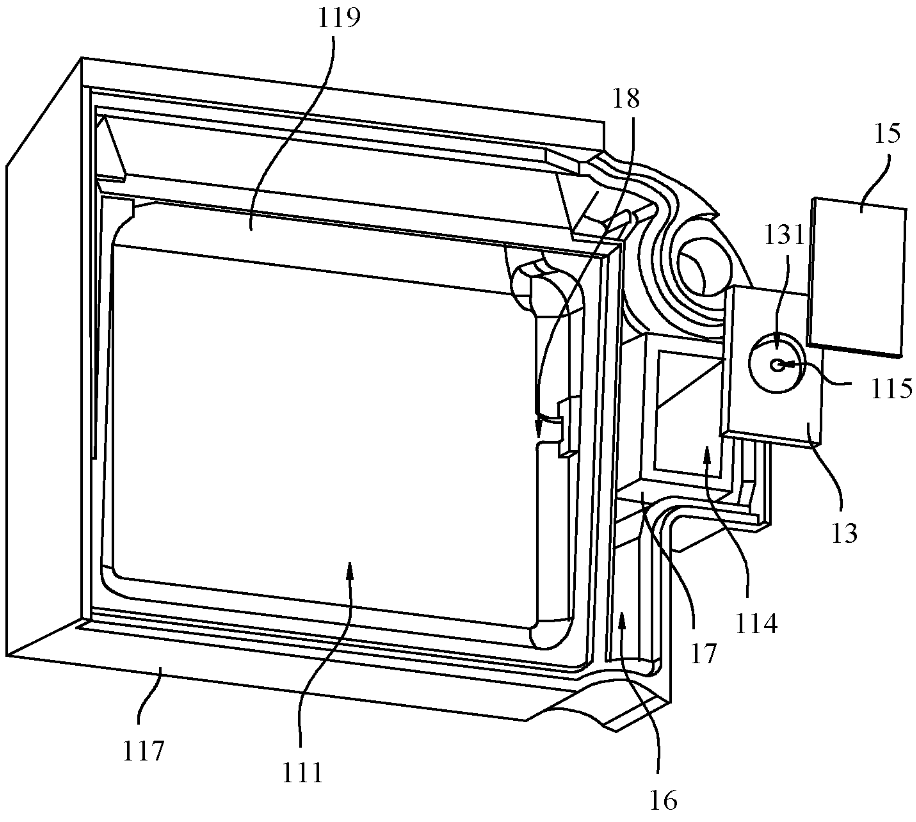
FIG. 11 is a schematic diagram 3 of a partial structure of a speaker according to an embodiment of this application.

In some other embodiments of this application, as shown in FIG. 4, FIG. 5, and FIG. 11, in a manner of replacing the multihole object 14, the box 11 further includes a PET film. The PET film 15 covers a side that is of the cover plate 13 and that faces the resonant cavity 114, and a second breather region 152 (as shown in FIG. 4) that communicates with the resonant cavity 114 is formed between the PET film 15 and the cover plate 13. Alternatively, the PET film 15 covers a side that is of the cover plate 13 and that faces away from the resonant cavity 114, and a first breather region 151 (as shown in FIG. 5) that communicates with the second cavity 112 is formed between the PET film 15 and the cover plate 13.

Specifically, as shown in FIG. 4, FIG. 5, and FIG. 11, in this embodiment, the PET film 15 is used to replace the multihole object 14, and the PET film 15 covers the cover plate 13. In this way, the airflow that enters and exits the second cavity 112 through the microhole 115 may be blocked by the PET film 15 and enter the resonant cavity 114 through the second breather region 152 or enter the second cavity 112 through the first breather region 151. The volume of airflow that enters and exits the second cavity 112 may be effectively adjusted by controlling a size of region space of the second breather region 152 or the first breather region 151. Therefore, costs of adjusting the volume of airflow that enters and exits the second cavity 112 are reduced. The PET film 15 has high impact resistance performance and a non-toxic property, and therefore the PET film 15 can be used stably in the speaker 10 for a long time, and improve environmental friendliness of the speaker 10 in terms of material selection.

Optionally, as shown in FIG. 6, as an alternative to canceling the design of the second breather region 152 or the first breather region 151, several breather holes 153 may be directly disposed on the PET film 15, so that the PET film 15 is breathable, and the airflow that enters and exits the second cavity 112 may directly flow into the second cavity 112 or the resonant cavity 114 through the breather holes 153 after passing through the microhole 115. In this way, a breathable structure of the PET film 15 can be simplified, to reduce overall manufacturing costs of the speaker 10.

In some other embodiments of this application, as shown in FIG. 7 to FIG. 9, the connection channel 18 is disposed on an inner wall of the enclosure frame 119, the connection channel 18 communicates with the resonant cavity 114, and a cross-sectional area of the connection channel 18 is greater than an opening area of the microhole 115. Specifically, the connection channel 18 may be disposed through mechanical processing, or may be formed during injection molding of the box 11.

It is set that the cross-sectional area of the connection channel 18 is greater than the opening area of the microhole 115, so that a speed at which the airflow enters the resonant cavity 114 from the first cavity 111 is greater than a speed at which the airflow enters the second cavity 112 from the resonant cavity 114, to reduce a speed at which the airflow is exchanged between the first cavity 111 and the second cavity 112.

In some other embodiments of this application, the cross-sectional area of the connection channel 18 is 2 to 15 times the opening area of the microhole 115. Specifically, it is set that the cross-sectional area of the connection channel 18 is 2 to 15 times the opening area of the microhole 115, to precisely control the speed at which the airflow is exchanged between the first cavity 111 and the second cavity 112.

Optionally, the cross-sectional area of the connection channel 18 is 4 to 9 times the opening area of the microhole 115. Specifically, it is set that the cross-sectional area of the connection channel 18 is 4 to 9 times the opening area of the microhole 115, to precisely control the speed at which the airflow is exchanged between the first cavity 111 and the second cavity 112, and to avoid a case in which the microhole 115 is manufactured with an excessively small size to meet a multiple relationship between the opening area of the microhole 115 and the cross-sectional area of the connection channel 18. In this way, the volume of airflow that enters and exits the second cavity 112 is controlled, and difficulty in disposing the microhole 115 is reduced.

In some other embodiments of this application, the aperture of the microhole 115 ranges from 0.5 mm to 2 mm. Specifically, the aperture of the microhole 115 is set to range from 0.5 mm to 2 mm, to effectively control the volume of airflow that enters and exits the second cavity 112.

The foregoing description is merely example embodiments of this application, but is not intended to limit this application. Any modification, equivalent replacement, or improvement made without departing from the spirit and principle of this application should fall within the protection scope of this application.

What is claimed is:

1. A mobile terminal, comprising a housing and a speaker disposed in the housing, wherein the speaker comprises a box and a sound generation unit configured to generate a sound;

the box comprises a first cover body, a second cover body and a cover plate, with the second cover body and the cover plate being located on the first cover body;

the sound generation unit is disposed in the first cover body, a first cavity is formed between the sound generation unit and an inner bottom wall of the first cover body, and a sound hole that communicates with an external environment of the housing is disposed in the first cavity;

a second cavity is formed between the sound generation unit and an inner top wall of the second cover body;

the sound generation unit comprises a diaphragm configured to generate a sound through vibration, and two opposite surfaces of the diaphragm respectively correspond to the first cavity and the second cavity, an outer surface of the diaphragm faces the second cavity; and a resonant cavity is formed in the first cover body and communicates with the first cavity, a through hole is disposed on a side of the resonant cavity with the side of the resonant cavity facing the second cavity, the cover plate covers the through hole, and a microhole that communicates with the second cavity is disposed on the cover plate.

2. The mobile terminal according to claim 1, wherein an enclosure frame is disposed in the first cover body, the sound generation unit is built into the enclosure frame, a first region is formed at an interval between an inner sidewall of the first cover body and an outer sidewall of the enclosure frame, a block object is disposed in the first region, and the resonant cavity is disposed in the block object.

3. The mobile terminal according to claim 2, wherein the box further comprises a multihole object, and the multihole object is disposed on the cover plate and covers the microhole.

4. The mobile terminal according to claim 3, wherein the multihole object is attached to a side of the cover plate with the side of the cover plate facing or facing away from the resonant cavity.

5. The mobile terminal according to claim 3, wherein a concave cavity is disposed on a side of the cover plate with the side of the cover plate facing or facing away from the resonant cavity, the multihole object is mounted in the concave cavity, and the microhole is disposed at a bottom of the concave cavity.

6. The mobile terminal according to claim 5, wherein a gap is formed between an outer edge of the multihole object and a cavity wall of the concave cavity.

7. The mobile terminal according to claim 3, wherein the multihole object is a mesh made of a nonwoven fabric; or the multihole object is a mesh formed by stacking a nonwoven fabric and degreased gauze.

8. The mobile terminal according to claim 1, wherein the box further comprises a polyethylene-terephthalate (PET) film, the PET film covers a side that is of the cover plate and that faces the resonant cavity, and a breather region that communicates with the resonant cavity is formed between the PET film and the cover plate.

9. The mobile terminal according to claim 1, wherein the box further comprises a polyethylene-terephthalate (PET) film, the PET film covers a side that is of the cover plate and that faces away from the resonant cavity, and a breather region that communicates with the second cavity is formed between the PET film and the cover plate.

10. The mobile terminal according to claim 1, wherein the box further comprises a polyethylene-terephthalate (PET) film, the PET film covers a side of the cover plate with the side of the cover plate facing or facing away from the resonant cavity, and several breather holes are disposed on the PET film.

11. The mobile terminal according to claim 2, wherein a connection channel is disposed on an inner wall of the enclosure frame, the connection channel penetrates through the enclosure frame and the block object, and communicates with the resonant cavity, and a cross-sectional area of the connection channel is greater than an opening area of the microhole.

12. The mobile terminal according to claim 11, wherein the cross-sectional area of the connection channel is 2 to 15 times the opening area of the microhole.

13. The mobile terminal according to claim 1, wherein an aperture of the microhole ranges from 0.5 mm to 2 mm.

* * * * *